United States Patent [19]

Otake

[11] Patent Number: 4,539,584

[45] Date of Patent: Sep. 3, 1985

[54] TELEVISION CAMERA HAVING AN OPTICAL FILTER

[75] Inventor: Yoshichi Otake, Kamakura, Japan

[73] Assignee: Victor Company of Japan, Ltd., Japan

[21] Appl. No.: 543,399

[22] Filed: Oct. 19, 1983

[30] Foreign Application Priority Data

Oct. 22, 1982 [JP] Japan ................... 57-185488

[51] Int. Cl.³ ............ H04N 9/04; H04N 9/07; H04N 9/09; G02B 5/28

[52] U.S. Cl. .................. 358/44; 358/55; 350/404

[58] Field of Search ............. 358/41, 44, 55; 350/400, 401, 404

[56] References Cited

U.S. PATENT DOCUMENTS 3,784,734  1/1974  Watanabe et al. .............. 358/55

FOREIGN PATENT DOCUMENTS 66449    6/1977  Japan ........................ 350/404
39683    3/1982  Japan ........................ 358/44
1363490  8/1974  United Kingdom.
2005432  4/1979  United Kingdom.

*Primary Examiner*—Michael A. Masinick
*Assistant Examiner*—Randall S. Svihla
*Attorney, Agent, or Firm*—Andrus, Sceales, Starke & Sawall

[57] ABSTRACT

A television camera which carries out color separation by use of vertical correlation in a picture, comprises a pickup element for scanning a target, a color separating stripe filter, and an optical filter for separating a single incident light beam in a direction which is the same as the scanning direction of the pickup element and a direction perpendicular to the scanning direction, by acting on the single incident light beam in two dimensions. The optical filter comprises a first double refraction transparent plate for separating a light beam in a direction which coincides with the scanning direction of the pickup element, a second double refraction transparent plate for separating a light beam in a direction which is rotated by 45° with respect to the scanning direction, and a third double refraction transparent plate for separating a light beam in a direction perpendicular to the scanning direction. The first, second, and third double refraction transparent plates are stacked.

7 Claims, 12 Drawing Figures

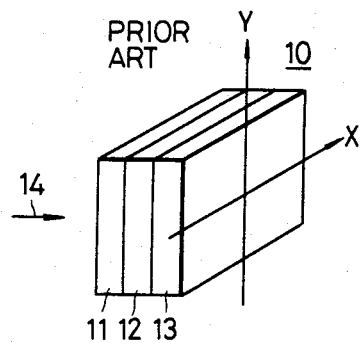
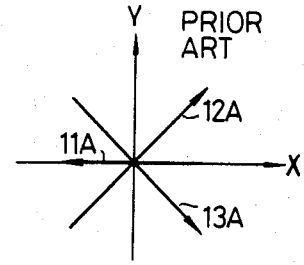
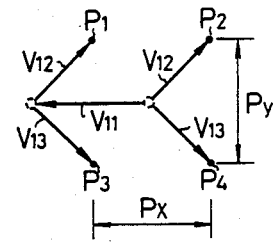
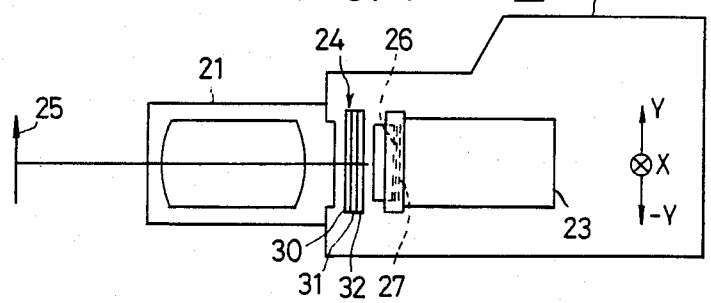
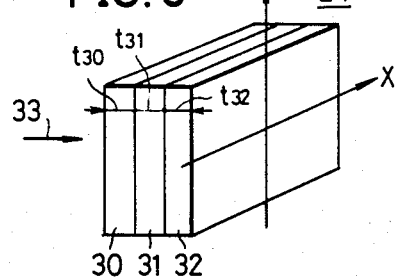

TELEVISION CAMERA HAVING AN OPTICAL FILTER

BACKGROUND OF THE INVENTION

The present invention generally relates to television cameras having an optical filter, and more particularly to a television camera having an optical filter which is capable of preventing the generation of color beat which is easily generated with respect to two directions, one direction being the scanning direction of an electron beam within the pickup tube and the other direction being perpendicular to the scanning direction, when a color separation is carried out by using the vertical correlation of output color signals in mutually adjacent scanning lines, and is also capable of preventing deterioration in the resolution.

In a television camera which uses a single pickup tube, a color separating optical system including a color stripe filter is employed. However, in such an optical system, beat is introduced between the high-frequency component of the luminance signal and the chrominance signal. Accordingly, in order to reduce the high-frequency component of the luminance signal so as to reduce the above beat, an optical lowpass filter is generally employed. Normally, such an optical lowpass filter has an attenuation pole in the filter characteristic.

In the television camera of the type which carries out the color separation by use of the vertical correlation in the picture, the chrominance signal is separated by delaying the output signal related to an N-th (N is an integer) scanning line and the output signal related to a (N+1)-th scanning line by one horizontal scanning period, or by shifting the phase by $\pi/2$, and carrying out series of addition, subtraction, and detection. For example, this type of a television camera employs a pickup tube which comprises an intercrossing type filter, or employs a solid state image pickup element which comprises a filter having a Bayer arrangement. In a television camera of this type, a spurious signal is generated due to the high-frequency component of the luminance signal, and color beat is generated in a first direction (generally, in the horizontal direction) which is the same as the scanning direction of the electron beam within the pickup tube and in a direction (generally, in the vertical direction) perpendicular to the first direction. The color beat with respect to the vertical direction is generated when the vertical correlation cannot be used. When scanning the vertical end of the picture, the output signal related to the N-th scanning line and the output signal of the (N+1)-th scanning line become completely unrelated to each other, and there is no vertical correlation. For example, if the N-th scanning line scans white and the (N+1)-th scanning line scans black, the desired primary colors of red (R) and blue (B) cannot be obtained, and the three primary colors of red (R), green (G), and blue (B) become unbalanced. When such an unbalance occurs, unwanted color will appear on the screen of a monitoring television receiver. Generally, an optical filter which acts in the horizontal and vertical directions, that is, in two dimensions, is inserted in the optical system so as to eliminate the above color beat.

Conventionally, as an optical filter of the type described above, there was an optical filter comprising first, second, and third separation crystal plates which are stacked as will be described later on. The first separation crystal plate was designed to separate the light beam in the scanning direction, and the second separation crystal plate was designed to separate the light beam in a direction which is rotated counterclockwise with respect to the axis of the scanning direction by 45°. The third separation crystal plate was designed to separate the light beam in a direction which is rotated clockwise with respect to the above axis of the scanning direction by 45°.

According to the conventional optical filter described above, a single incident light beam is separated in two directions, that is, in the horizontal and vertical directions. In other words, the optical filter acts in two dimensions, and the light beam separated in the horizontal direction and the light beam separated in the vertical direction are each separated into two rays. Four rays are thus obtained from the single incident light beam. However, as will be described later on, with respect to the horizontal direction (scanning direction), it is impossible to prevent the generation of color beat in a frequency band in the vicinity of a frequency which is twice the carrier frequency. Moreover, with respect to the vertical direction (direction perpendicular to the scanning direction), it is possible to prevent the generation of color beat, however, the resolution becomes poor because of the excess effect of preventing the generation of the color beat. These undesirable phenomenons are introduced because the conventional optical filter only acts in two dimensions. As a result, there was a disadvantage in that a pattern including fine stripes could not be picked up by the television camera employing the conventional optical filter.

SUMMARY OF THE INVENTION

Accordingly, it is a general object of the present invention to provide a novel and useful television camera having an optical filter, in which the above described disadvantages have been eliminated.

Another and more specific object of the present invention is to provide a television camera having an optical filter, in which a single incident light beam is separated in two directions, namely, the scanning direction of the electron beam within the pickup tube and a direction perpendicular to the scanning direction, and the light beam separated in the scanning direction and the light beam separated in the direction perpendicular to the scanning direction are each separated into four rays so that eight rays are obtained from the single incident light beam. According to the television camera of the present invention, the generation of color beat is effectively prevented with respect to the direction perpendicular to the scanning direction, without deteriorating the resolution, and it is possible to obtain a satisfactory resolution. In addition, with respect to the scanning direction, the generation of color beat is effectively prevented in a frequency band in the vicinity of the carrier frequency, and also in a frequency band in the vicinity of a frequency which is twice the carrier frequency.

Other objects and further features of the present invention will be apparent from the following detailed description when read in conjunction with the accompanying drawings.

BRIEF DESCRIPTION OF THE DRAWINGS

FIG. 1 is a perspective view showing an example of a conventional optical filter;

FIGS. 2 and 3 respectively show the separating directions and separation states of the light beam in each of the crystal plates of the optical filter shown in FIG. 1;

FIG. 4 generally shows an embodiment of an optical system in a television camera having an optical filter according to the present invention;

FIG. 5 is a perspective view showing an embodiment of an optical filter employed in the television camera according to the present invention;

DETAILED DESCRIPTION

Figure 6:
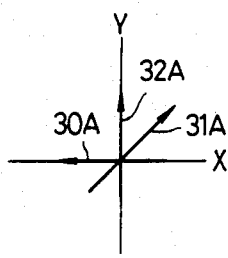
FIG. 6 is a diagram for explaining the separating directions of the light beam in each of the crystal plates in the optical filter shown in FIG. 5.

A conventional optical filter 10 shown in FIG. 1 comprises separation crystal plates 11, 12, and 13 which are stacked. The separation crystal plate 11 is designed to separate the light beam in a direction (indicated by an arrow 11A in FIG. 2) which coincides with the scanning direction (the direction of the X-axis in FIG. 2), and the separation crystal plate 12 is designed to separate the light beam in a direction (indicated by an arrow 12A in FIG. 2) which is rotated counterclockwise with respect to the axis of the scanning direction by 45°. The separation crystal plate 13 is designed to separate the light beam in a direction (indicated by an arrow 13A) which is rotated clockwise with respect to the above axis of the scanning direction by 45°. According to this optical filter 10, a single incident light beam 14 is separated in the scanning direction and a direction (the direction of the Y-axis in FIG. 2) perpendicular to the scanning direction. Further, the light beam separated in the scanning direction and the light beam separated in the direction which is perpendicular to the scanning direction, are each separated into two rays. That is, as shown in FIG. 3, the single incident light beam 14 is separated into four rays which respectively pass through points $P_1$, $P_2$, $P_3$, and $P_4$. In FIG. 3, vectors $V_{11}$, $V_{12}$, and $V_{13}$ represent the separating direction and separating distance in each of the crystal plates 11, 12, and 13.

In this optical filter 10, because a single incident light beams is separated into two rays in the direction of the Y-axis, a modulation transfer factor (MTF) characteristic with respect to the direction perpendicular to the scanning direction may be described by the following equation.

$$M_{v'} = \cos \pi f^* P_y$$

Figure 9:
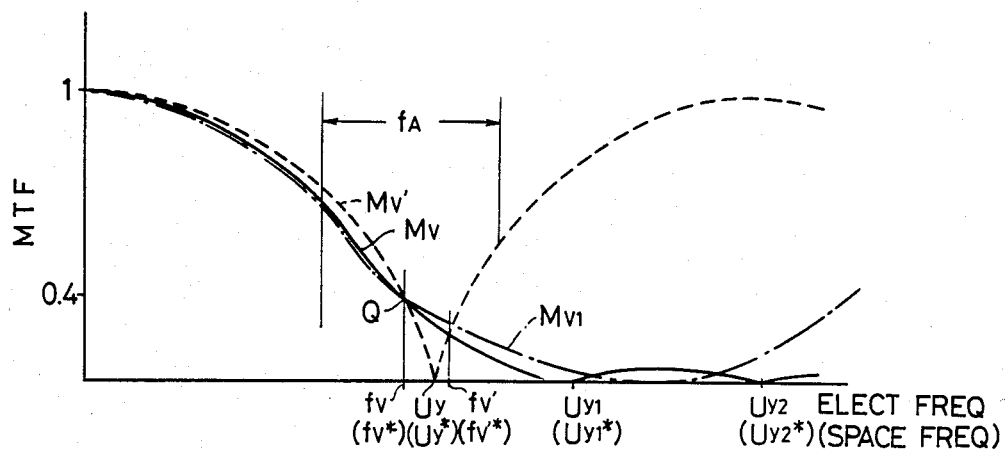
FIG. 9 is a graph showing a modulation transfer factor (MTF) characteristic of the optical filters shown in FIGS. 1 and 5 with respect to a direction (generally, in the vertical direction) which is perpendicular to the scanning direction of the image pickup element.

In the above equation, f* represents the space frequency, and $P_y$ represents the separating distance between the separated rays along the Y-axis. As shown in FIG. 9, the characteristic curve $M_{V'}$ is a curve which falls sharply at a trap point $U_y$. Thus, the value of the MTF decreases greatly beyond a vertical spurious signal frequency $f_V$ and the effect of eliminating the spurious signal is large, however, the resolution becomes poor. This vertical spurious signal frequency $f_V$ is obtained by converting the frequency of the spurious signal which is generated when a pattern including stripes which are parallel to the scanning direction is picked up, to a frequency in the scanning direction. Therefore, the optical filter 10 was disadvantageous because the resolution was poor in the higher frequency band in the vicinity of the frequency $f_V$.

On the other hand, the MTF characteristic of the optical filter 10 with respect to the scanning direction, may be described by the following equation.

$$M_{H'} = \cos \pi f^* P_x$$

Figure 10:
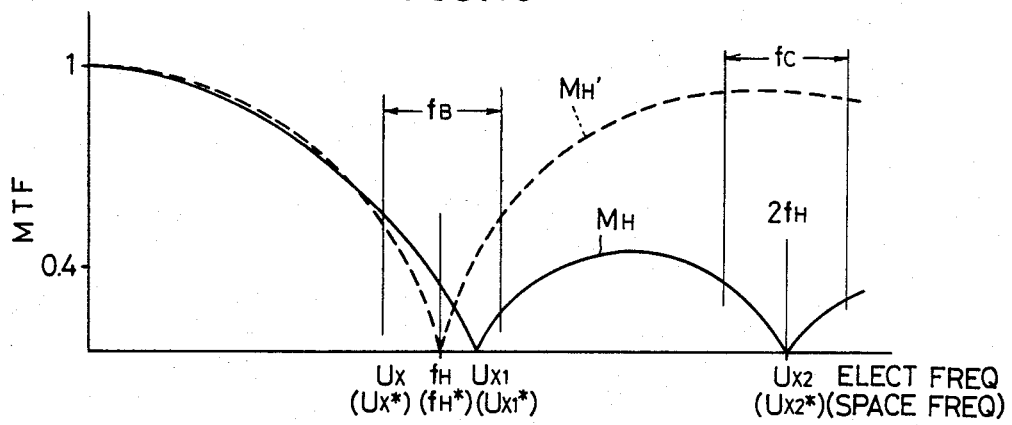
FIG. 10 is a graph showing an MTF characteristic of the optical filters shown in FIGS. 1 and 5 with respect to the scanning direction (generally, in the horizontal direction) of the image pickup element.

In the above equation, f* represents the space frequency, and $P_x$ represents the separating distance between the separated rays along the X-axis. The characteristic curve $M_{H'}$ is shown in FIG. 10. As may be seen from FIG. 10, there was a disadvantage in that the effect of eliminating the spurious signal (color beat) in a frequency band in the vicinity of a frequency which is twice the carrier frequency.

The present invention has overcome the disadvantages of the conventional television camera having the optical filter 10, and an embodiment of the television camera according to the present invention will now be described.

In a television camera 20 shown in FIG. 4, a lens 21 is detachably mounted on a main television camera body 22. A pickup tube 23, and an optical filter 24 which constitutes an essential part of the present invention, are built into the main television camera body 22. The optical filter 24 is arranged in front of the pickup tube 23. The light from an object passes the lens 21, the optical filter 24, a color separating stripe filter 26 provided in front of the pickup tube 23, and reaches a target 27 of the pickup tube 23. The target 27 is scanned in the direction of X, with the scan being successively shifted toward the direction of −Y. A chrominance multiplexed signal is obtained from an output terminal (not shown) of the target 27. This chrominance multiplexed signal is passed through a demodulating circuit and a color encoder within the main television camera body 22, and is produced from the main television camera body 22 as a color video signal which is in conformance with a predetermined color television system.

As shown in FIG. 5, the optical filter 24 comprises separation crystal plates 30, 31, and 32 which are stacked. The separation crystal plate 30 is designed to separate the light beam in a direction indicated by an arrow 30A in FIG. 6 which coincides with the scanning direction of the electron beam within the pickup tube 23. The direction indicated by the arrow 30A coincides with the X-axis. The separation crystal plate 31 is designed to separate the light beam in a direction indicated by an arrow 31A which is rotated with respect to the scanning direction by 45°. Further, the separation crystal plate 32 is designed to separate the light beam in a direction indicated by an arrow 32A which is perpendicular to the above scanning direction. The direction indicated by the arrow 32A coincides with the Y-axis.

Figure 7A:
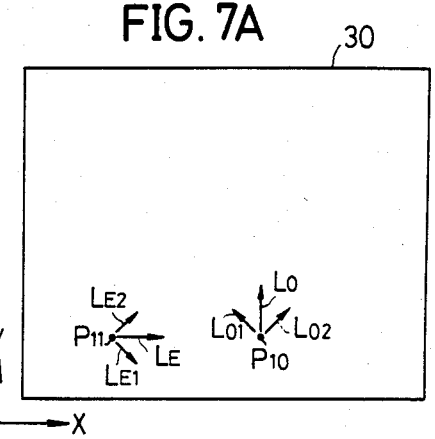
FIGS. 7A, 7B, and 7C are diagrams for explaining the separation states of the light beam in each of the crystal plates in the optical filter shown in FIG. 5.
Figure 7B:
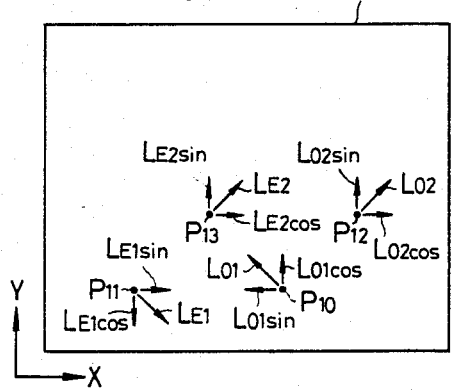
Figure 7C:
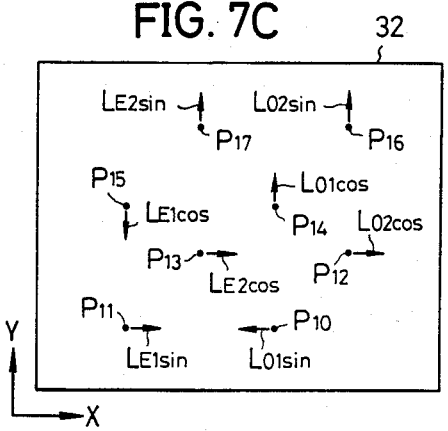
Figure 8:
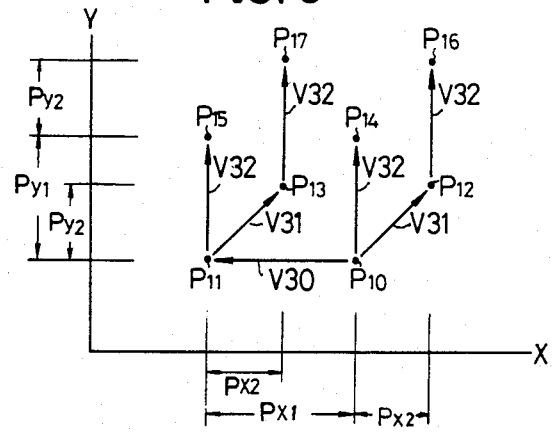
FIG. 8 shows the separation state of the light beam in the optical filter shown in FIG. 5 as a whole.

According to the optical filter 24, a single incident light beam 33 is separated as shown in FIGS. 7A, 7B, 7C, and 8. In FIG. 8, vectors $V_{30}$, $V_{31}$, and $V_{32}$ represent the separating direction and separating distance in each of the crystal plates 30, 31, and 32.

The incident light beam 33 first reaches a point $P_{10}$ in the separation crystal plate 30. A double refraction occurs at the point $P_{10}$, and as shown in FIG. 7A and indicated by the vector $V_{30}$ in FIG. 8, the incident light beam 33 is separated into an ordinary ray $L_O$ which passes through the point $P_{10}$ and an extraordinary ray $L_E$ which passes through a point $P_{11}$ in the separation crystal plate 30.

The rays $L_O$ and $L_E$ reach the separation crystal plate 31 provided in the subsequent stack. When the rays $L_O$ and $L_E$ are divided into components in a direction which coincides with the optical axis (45° with respect to the scanning direction) of the separation crystal plate 31 and in a direction perpendicular to this optical axis, rays (components) $L_{O1}$ and $L_{E1}$ are ordinary rays and rays )components) $L_{O2}$ and $L_{E2}$ are extra-ordinary rays in the separation crystal plate 31. Accordingly, the two rays $L_O$ and $L_E$ are separated into the rays $L_{O1}$ and $L_{E1}$ and the rays $L_{O2}$ and $L_{E2}$ in the separation crystal plate 31. The rays $L_{O1}$ and $L_{E1}$ respectively travel straight through points $P_{10}$ and $P_{11}$ in the separation crystal plate 31 as shown in FIG. 7B. The points $P_{10}$ and $P_{11}$ in the separation crystal plate 31 respectively coincide with the points $P_{10}$ and $P_{11}$ when viewed from a direction perpendicular to the plane including the X-axis and the Y-axis. On the other hand, the rays $L_{O2}$ and $L_{E2}$ are refracted in the direction which is 45° with respect to the scanning direction as indicated by the vector $V_{31}$ in FIG. 8, and respectively pass through points $P_{12}$ and $P_{13}$.

When the four separated rays $L_{O1}$, $L_{O2}$, $L_{E1}$, and $L_{E2}$ are divided into sine components and cosine components in the X-axis and the Y-axis, rays $L_{O1cos}$, $L_{E1cos}$, $L_{O2sin}$, and $L_{E2sin}$ are extra-ordinary rays (components) and rays $L_{O1sin}$, $L_{E1sin}$, $L_{O2cos}$, and $L_{E2cos}$ are ordinary rays in the separation crystal plate 32 provided in the subsequent stack. Thus, among the rays passing through points $P_{10}$ through $P_{13}$ in the separation crystal plate 32, the ordinary rays travel staight while the extra-ordinary rays are refracted in the direction of the Y-axis as indicated by the vector $V_{32}$ in FIG. 8. Therefore, the rays passing through the points $P_{10}$ through $P_{13}$ are separated into eight rays which respectively pass through points $P_{10}$ through $P_{17}$ as shown in FIG. 7C.

Accordingly, the light beam which passes through the optical filter 24 undergoes double refraction, and image formation is obtained at eight mutually separated points on the target 27 as shown in FIG. 8. The energy distribution (spectrum) of the optical image at the target 27 with respect to the X-axis and the Y-axis, becomes as shown in FIG. 8.

In the optical filter 24, the incident light beam 33 is separated in the direction of the Y-axis by the separation crystal plates 31 and 32, and is also separated in the direction of the X-axis by the separation crystal plates 31 and 32. Accordingly, each of the points $P_{10}$ through $P_{17}$ can be described by two kinds of separating distances with respect to the Y-axis and the X-axis, respectively. If the separating distance obtained by the separation crystal plate 32 is represented by $P_{y1}$, and the separation distance obtained by the separation crystal plate 31 is represented by $P_{y2}$, the luminous energy distribution of the separated image with respect to the direction of the Y-axis may be described by the following equation when the luminous energy of the incident light beam 33 is assumed to be unity (1).

$$G(Y) = \tfrac{1}{4}\left\{ \delta\left(Y - \frac{P_{y1} + P_{y2}}{2}\right) + \delta\left(Y - \frac{P_{y1} - P_{y2}}{2}\right) + \delta\left(Y + \frac{P_{y1} - P_{y2}}{2}\right) + \delta\left(Y + \frac{P_{y1} + P_{y2}}{2}\right) \right\}$$

In the above equation, $\delta$ represents a $\delta$-function.

When this function is subjected to Fourier integration, the MTF characteristic with respect to the direction perpendicular to the scanning direction can be described by the following equation.

$$M_V = \int_{-\infty}^{\infty} G(Y)e^{-j2\pi f^*}dy$$

$$= \cos\pi f^* P_{y1} \cdot \cos\pi f^* P_{y2}$$

As shown in FIG. 9, the characteristic curve $M_V$ which is indicated by a solid line, does not fall sharply in reaching the trap point as in the case of the characteristic curve $M_V'$ indicated by a dotted line. Instead, the trap point is reached gradually according to the characteristic curve $M_V$. In FIG. 9 and FIG. 10 which will be described later on, the horizontal axis indicates the electrical frequency, and the space frequency is shown in brackets.

As clearly seen from the equation above, the MTF characteristic with respect to the direction perpendicular to the scanning direction changes according to the separating distances $P_{y1}$ and $P_{y2}$, that is, a thickness $t_{31}$ of the separation crystal plate 31 and a thickness $t_{32}$ of the separation crystal plate 32. In the present embodiment, the thickness $t_{31}$ of the separation crystal plate 13 is selected to 1.854 mm and the thickness $t_{32}$ of the separation crystal plate 32 is selected to 2.8857 mm, so that an allowable limit Q (MTF of 0.4) of color beat generation is obtained at the vertical spurious signal frequency $f_V$ (3.13 MHz). If calculated under the above conditions and described by an electrical frequency $U_y$, a first trap point $U_{y1}^*$ ($=\tfrac{1}{2}P_{y1}$) becomes equal to 4.5 MHz and a second trap point $U_{y2}^*$ ($=\tfrac{1}{2}P_{y2}$) becomes equal to 9.5054 MHz.

On the other hand, if the MTF characteristic of the conventional example described before with respect to the direction perpendicular to the scanning direction is set so as to pass the allowable limit Q, the electrical frequency $U_y$ corresponding to the trap point $U_y^*$ becomes equal to 4.25 MHz.

Accordingly, in the MTF characteristic of the optical filter 24 with respect to the direction perpendicular to the scanning direction, the curve falls gradually in reaching the first trap point $U_{y1}$. Moreover, this first trap point $U_{y1}$ is located at a position shifted toward the high frequency range when compared to the trap point $U_y$ of the conventional optical filter 10 shown in FIG. 1. Thus, the curves $M_V$ and $M_V'$ coincide at the point Q within a frequency band $f_A$ wherein the color beat is generated. In the frequency range lower than the frequency $f_V$, the curve $M_V$ becomes slightly lower than the curve $m_V'$. On the other hand, in the frequency range higher than the frequency $f_V$, the curve $M_V$ is higher than the curve $M_V'$ up to a frequency $f_{V1}$, but the curve $M_V$ becomes lower than the curve $M_V'$ when the frequency $f_{V1}$ is exceeded.

Therefore, the following results are obtained if the characteristic of the television camera having the optical filter 24 is compared with the characteristic of the television camera having the conventional optical filter 10. That is, the advantageous features of the television camera having the optical filter 24 are as follows.

1. The effect of eliminating the color beat is substantially the same at the vertical spurious signal frequency $f_V$.

2. The MTF decreases in the frequency range lower than the frequency $f_V$, and the effect of eliminating the color beat is satisfactory in this frequency range. In addition, because the MTF only decreases to a small extent in the frequency range lower than the frequency band $f_A$, there is virtually no deterioration in the resolution.

3. In the frequency band higher than the frequency $f_V$ and up to the frequency $f_V'$, the MTF is lower than the allowable limit 0.4, however, the MTF is considerably high compared to the MTF in the curve $M_V'$. Thus, in this frequency band, it is possible to keep the color beat under an allowable value and also maintain a satisfactory resolution. As a result, the resolution is improved compared to the television camera having the conventional optical filter 10.

4. In the frequency band exceeding the frequency $f_V'$, the MTF decreases, and the effect of eliminating the color beat is improved. The decrease in the MTF in this frequency band does not become a problem.

By summarizing the above advantageous features under items 1 through 4, it can be said that the television camera having the optical filter 24 has a characteristic which enables elimination of the vertical spurious signal while maintaining the necessary balance with respect to the resolution. That is, it is possible to present the generation of color beat in the direction perpendicular to the scanning direction, while maintaining a satisfactory resolution.

Further, the MTF of the optical filter 24 with respect to the scanning direction can be described by the following equation, similarly as in the case of the MTF with respect to the direction perpendicular to the scanning direction.

$$M_H = \int_{-\infty}^{\infty} G(X)e^{-j2\pi f^*}dx$$

$$= \cos\pi f^* P_{x1} \cdot \cos\pi f^* P_{x2}$$

In the equation above, G(X) represents the luminous energy distribution of the separated image with respect to the direction of the X-axis, $P_{x1}$ represents the separating distance obtained by the separation crystal plate 30, $P_{x2}$ represents the separating distance obtained by the separation crystal plate 31. This MTF characteristic with respect to the scanning direction changes according to a thickness $t_{30}$ of the separation crystal plate 30 and the thickness $t_{31}$ of the separation crystal plate 31. In the present embodiment, the thickness $t_{30}$ of the separation crystal plate 30 is selected to 3.02 mm, and the thickness $t_{31}$ of the separation crystal plate 31 is selected to 1.854 mm as described before.

The MTF characteristic with respect to the scanning direction becomes as indicated by a curve $M_H$ in FIG. 10. In FIG. 10, the MTF characteristic of the conventional optical filter 10 shown in FIG. 10 with respect to the scanning direction, is indicated by a curve $M_H'$. The curve $M_H$ has two trap points, and a first trap point $U_{x1}$ is located at a frequency range slightly higher than the trap point $U_x$ of the characteristic curve $M_H'$. A second trap point of the curve $M_H$ coincides with a frequency $2f_H$ which is twice the carrier frequency $f_H$.

Therefore, the following results are obtained if the characteristic of the television camera having the optical filter 24 is compared with the characteristic of the television camera having the conventional optical filter 10. That is, the advantageous features of the television camera having the optical filter 24 are as follows.

i. The MTF is of course lower than the allowable limit 0.4 in a frequency band $f_B$ which is in the vicinity of the carrier frequency and in which frequency band the horizontal spurious signal is generated, but is also lower than the allowable limit 0.4 in a frequency band $f_C$ which is in the vicinity of the frequency $2f_H$ which is twice the carrier frequency $f_H$ and in which frequency band the horizontal spurious signal is generated. Thus, the generation of the color beat is effectively prevented with respect to the scanning direction.

ii. The MTF of the optical filter 24 is higher than the MTF of the conventional optical filter 10, in the vicinity of the frequency $f_H$ and a frequency range lower than the frequency $f_H$ within the frequency band $f_B$. Hence, according to the television camera of the present invention, it is possible to obtain a satisfactory resolution also with respect to the scanning direction.

The optical filter 24 may also be designed by appropriately selecting the thicknesses $t_{31}$ and $t_{32}$ of the separation crystal plates 31 and 32 so that the separating distances $P_{y1}$ and $P_{y2}$ become equal to each other. For example, if the thickness $t_{31}$ of the separation crystal plate 31 is selected to 3.3101 mm and the thickness $t_{32}$ of the separation crystal plate 32 is selected to 2.3406 mm, the separation distances $P_{y1}$ and $P_{y2}$ become equal to each other. In this case, the trap points $U_{y1}$ and $U_{y2}$ close upon each other and become equal, that is, the trap points $U_{y1}$ and $U_{y2}$ both become equal to 5.548 MHz, and the MTF characteristic with respect to the direction perpendicular to the scanning direction becomes as indicated by a curve $m_{V1}$ in FIG. 9. The characteristic curve $M_{V1}$ is a curve which passes through the allowable limit Q at the frequency $f_V$, and falls even more gradually than the curve $M_V$ in the frequency range which is higher than the frequency $f_V$. Accordingly, according to the television camera having an optical filter of this design, it is possible to prevent deterioration in the resolution in the frequency range which is higher than the frequency $f_V$. That is, it is possible to prevent the generation of the color beat, and simultaneously obtain a satisfactory résolution.

Furthermore, instead of the pickup tube 23 which is employed in the embodiment described heretofore, the television camera according to the present invention may also be designed by employing a semi-conductor pickup element, that is, a solid state pickup element.

In addition, the optical filter 24 may also be designed by interchanging the locations of the separation crystal plates 30 and 32, with the separation crystal plate 31 kept disposed between the separation crystal plates 30 and 32. Moreover, in the optical filter 24, the separating direction in the separation crystal plate 31 is set to a direction rotated clockwise by 45° with respect to the scanning direction or to a direction rotated counterclockwise by 45° with respect to the scanning direction, in order to prevent the generation of red color beat.

Further, the present invention is not limited to these embodiments, but various variations and modifications may be made without departing from the scope of the present invention.

What is claimed is:

1. A television camera which carries out color separation by use of vertical correlation in a picture, said television camera comprising:
   a pickup element for scanning a target;
   a color separating stripe filter; and
   an optical filter for separating a single incident light beam in a direction which is the same as the scanning direction of said pickup element and a direction perpendicular to said scanning direction, by acting on said single incident light beam in two dimensions,
   said optical filter comprising a first double refraction transparent plate for separating a light beam in a direction which coincides with said scanning direction of said pickup element, a second double refraction transparent plate for separating a light beam in a direction which is rotated by 45° with respect to said scanning direction, and a third double refraction transparent plate for separating a light beam in a direction perpendicular to said scanning direction, said first, second, and third double refraction transparent plates being stacked.

2. A television camera as claimed in claim 1 in which said optical filter has a stacked arrangement in which said second double refraction transparent plate is disposed at a location between said first and third double refraction transparent plates.

3. A television camera as claimed in claim 1 in which thicknesses of said second and third double refraction transparent plates are selected so that a modulation transfer factor characteristic curve of said optical filter with respect to the direction perpendicular to said scanning direction passes an allowable limit of color beat generation at a vertical spurious signal frequency, where said vertical spurious signal frequency is obtained by converting the frequency of a spurious signal which is generated when a stripe pattern including stripes in parallel with said scanning direction is picked up into a frequency with respect to said scanning direction.

4. A television camera as claimed in claim 1 in which thicknesses of said second and third double refraction transparent plates are selected so that a modulation transfer factor characteristic curve of said optical filter with respect to the direction perpendicular to said scanning direction passes an allowable limit of color beat generation and includes a single trap point.

5. A television camera as claimed in claim 1 in which thicknesses of said first and second double refraction transparent plates are selected so that a modulation transfer factor characteristic curve of said optical filter with respect to said scanning direction includes a first trap point in a frequency range higher than a carrier frequency and a second trap point at a frequency which is twice said carrier frequency.

6. A television camera as claimed in claim 1 in which the separating direction of said second double refraction transparent plate in said optical filter is selected so as to effectively eliminate red color beat.

7. A television camera as claimed in claim 1 in which said first, second, and third double refraction transparent plates in said optical filter are respectively made up of crystal plates.

* * * * *